(12) United States Patent
Kim

(10) Patent No.: US 12,231,965 B2
(45) Date of Patent: *Feb. 18, 2025

(54) METHOD AND DEVICE FOR CHANGING SECONDARY BASE STATION IN WIRELESS MOBILE COMMUNICATION SYSTEM

(71) Applicants: BLACKPIN Inc., Seoul (KR); Soenghun Kim, Hanam-si (KR)

(72) Inventor: Soenghun Kim, Hanam-si (KR)

(73) Assignees: Blackpin Inc., Seoul (KR); Soenghun Kim, Hanam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,902

(22) Filed: Jan. 5, 2024

(65) Prior Publication Data

US 2024/0155438 A1 May 9, 2024

Related U.S. Application Data

(63) Continuation of application No. 18/238,542, filed on Aug. 28, 2023, now Pat. No. 11,910,246, which is a continuation of application No. PCT/KR2022/011128, filed on Jul. 28, 2022.

(30) Foreign Application Priority Data

Aug. 5, 2021 (KR) .......................... 10-2021-0103273

(51) Int. Cl.
*H04W 36/00* (2009.01)
*H04W 36/36* (2009.01)

(52) U.S. Cl.
CPC .............. *H04W 36/0016* (2013.01); *H04W 36/00835* (2018.08); *H04W 36/362* (2023.05)

(58) Field of Classification Search
CPC ......... H04W 36/0005; H04W 36/0016; H04W 36/0022; H04W 36/00222; H04W 36/0069; H04W 36/00692; H04W 36/00835; H04W 36/00698; H04W 36/24; H04W 36/362; H04W 36/28
See application file for complete search history.

(56) References Cited

U.S. PATENT DOCUMENTS

2021/0099926 A1  4/2021  Chen et al.

FOREIGN PATENT DOCUMENTS

| JP | 2018527851 | 9/2018 |
| KR | 20160093569 | 8/2016 |
| KR | 20200094059 | 8/2020 |

(Continued)

OTHER PUBLICATIONS

LG Electronics Inc., "Transaction ID Issue in CPC," 3GPP TSG-RAN WG2 Meeting #109 E-Meeting, R2-2001536, Feb. 24-Mar. 6, 2020.

(Continued)

*Primary Examiner* — Matthew W Genack
(74) *Attorney, Agent, or Firm* — Fish & Richardson P.C.

(57) ABSTRACT

A method and apparatus for secondary base station change in a mobile communication system are provided. Method for secondary node change includes receiving conditional reconfiguration information from the base station, transmitting to the base station a first response message with a transaction identifier, performing evaluation based on the configuration generated by a second base station and transmitting a second response message with an identifier indicating which conditional reconfiguration is executed.

20 Claims, 11 Drawing Sheets

(56) References Cited

FOREIGN PATENT DOCUMENTS

KR 20200131207 11/2020
WO 2021071192 4/2021

OTHER PUBLICATIONS

ZTE Corporation et al., "Discussion on conditional PSCell addition/change," 3GPP TSG-RAN WG2 Meeting #113 electronic, R2-2101566, Jan. 25-Feb. 5, 2021.
Nokia et al., "SN-initiated Conditional PSCell Change—clarifications," 3GPP TSG-RAN WG2 Meeting #114 Electronic Elbonia, R2-2104996, May 19-May 27, 2021.
Nokia et al., "Discussion on RAN3 LS on CPAC," 3GPP TSG-RAN WG2 Meeting #114 Electronic Elbonia, R2-2104998, May 19-May 27, 2021.
Futurewei, "Discussion on the procedure of SN initiated CPC," 3GPP TSG-RAN WG2 Meeting #114-e E-Conference, R2-2105012, May 19-May 27, 2021.
CATT, "Discussion on the remaining issues for SN initiated inter-SN CPC," 3GPP TSG-RAN WG2 Meeting #114 electronic Online, R2-2105060, May 19-May 27, 2021.
CATT, "Discussion on the inter-node message design," 3GPP TSG-RAN WG2 Meeting #114 electronic Online, R2-2105061, May 19-May 27, 2021.
China Telecommunication, "Remaining issues for source SN configuration update," 3GPP TSG-RAN WG2 Meeting #114 electronic Online, R2-2105202, May 19-May 27, 2021.
Qualcomm Incorporated, "CPAC procedures from network perspective," 3GPP TSG-RAN WG2 Meeting #114-e Online, R2-2105260, May 19-May 27, 2021.
ZTE Corporation et al., "Further consideration on CPAC," 3GPP TSG-RAN WG2 Meeting #114 electronic Online, R2-2105506, May 19-May 27, 2021.
Itri, "Procedures in CPAC and conventional PSCell change," 3GPP TSG-RAN2 Meeting #114-e eMeeting, R2-2105519 (Revision of R2-2103354), May 19-May 27, 2021.
NEC, "Signaling aspects for SN-initiated CPC," 3GPP TSG-RAN WG2 #114e Electronic meeting, R2-2105792, May 19-May 27, 2021.
Lenovo et al., "Discussion on CPAC procedures," 3GPP TSG-RAN WG2 Meeting #114e Online, R2-2105830, May 19-May 27, 2021.
Ericsson, "Conditional PSCell Addition Change," 3GPP TSG-RAN WG2 #114e Electronic meeting, R2-2105897, May 19-May 27, 2021.
Huawei et al., "Inter-node message design (with draft reply LS to RAN3)," 3GPP TSG-RAN WG2 Meeting #114-e Online, R2-2105988, May 19-May 27, 2021.
Huawei et al., "Source SN configuration update at or after SN-initiated CPC," 3GPP TSG-RAN WG2 Meeting #114-eOnline, R2-2105989, May 19-May 27, 2021.
Samsung, "CPAC stage 2 flow, progressing remaining issues," 3GPP TSG-RAN WG2#114 Meeting Online, Tdoc R2-2106059 (Revision of R2-2103932), May 19-May 27, 2021.
Huawei et al., "Source SN configuration update at or after SN-initiated CPC," 3GPP TSG-RAN WG2 Meeting #114-e Online, R2-2106436 (identical to R2-2105989 except figure 2 step 4 and final state), May 19-May 27, 2021.
Vivo, "Discussion on the configuration of CPAC," 3GPP TSG-RAN WG2 Meeting #114-e E-Meeting, R2-2104914, May 19-May 27, 2021.
Apple, "Details in conditional PSCell change and addition," 3GPP TSG-RAN WG2 Meeting #114-e Electronic, R2-2105111, May 19-May 27, 2021.
Qualcomm Incorporated, "CPAC procedures from UE perspective," 3GPP TSG-RAN WG2 Meeting #114-e Online, R2-2105261, May 19-May 27, 2021.
ZTE Corporation et al., "Further discussion on CPAC," 3GPP TSG-RAN WG2 Meeting #114 electronic Online, R2-2105507, May 19-May 27, 2021.
Ericsson, "UE procedures and signalling for CPAC," 3GPP TSG-RAN WG2 #114e Electronic meeting, R2-2105898, May 19-May 27, 2021.
Huawei et al., "Uu RRC message design in CPAC," 3GPP TSG-RAN WG2 Meeting #114-e Online, R2-2105990, May 19-May 27, 2021.
CATT, "TS 37.340 CR for CPA and inter-SN CPC," 3GPP TSG-RAN WG2 Meeting #114-e E-meeting, R2-2105062, May 19-May 27, 2021.
3GPP, "Further MR-DC enhancements," 3GPP TSG-RAN WG2 Meeting #114-e E-meeting, R2-2105986, May 19-May 27, 2021.
Huawei, "[AT114-e][230][R17 DCCA] Making progress (Huawei)," 3GPP TSG-RAN WG2 #114-e electronic Electronic Meeting, R2-2106505, May 19-May 27, 2021.
Nokia et al., "On CPAC Procedures and Further Functionalities," 3GPP TSG-RAN WG2 Meeting #114 Electronic Elbonia, R2-2104997, May 19-May 27, 2021.
3GPP TS 38.331 V16.5.0 (Jun. 2021); Technical Specification; 3rd Generation Partnership Project; Technical Specification Group Radio Access Network; NR; Radio Resource Control (RRC) protocol specification (Release 16).
3GPP TS 38.423 V16.6.0 (Jul. 2021); Technical Specification; 3rd Generation Partnership Project; Technical Specification Group Radio Access Network; NG-RAN; Xn application protocol (XnAP) (Release 16).
3GPP TS 38.473 V16.6.0 (Jul. 2021); Technical Specification; 3rd Generation Partnership Project; Technical Specification Group Radio Access Network; Ng-Ran; F1 application protocol (F1AP) (Release 16).
3GPP TS 36.331 V16.5.0 (Jun. 2021); Technical Specification; 3rd Generation Partnership Project; Technical Specification Group Radio Access Network; Evolved Universal Terrestrial Radio Access (E-UTRA); Radio Resource Control (RRC); Protocol specification (Release 16).
3GPP TS 37.340 V16.6.0 (Jun. 2021); Technical Specification; 3rd Generation Partnership Project; Technical Specification Group Radio Access Network; Evolved Universal Terrestrial Radio Access (E-UTRA) and NR; Multi-connectivity; Stage 2 (Release 16).
International Search Report for International Patent Application No. PCT/KR2022/011128, dated Oct. 28, 2022.
CATT, "Report of [post109e@13][NR MOB] Resolving open issues for CPC", 3GPP TSG-RAN WG2 Meeting #109bis-e R2-2003440 Electronic, Apr. 20-30, 2020.

User Plane Protocol Stack

Control Plane Protocol Stack

METHOD AND DEVICE FOR CHANGING SECONDARY BASE STATION IN WIRELESS MOBILE COMMUNICATION SYSTEM

CROSS-REFERENCE TO RELATED APPLICATION

This application is a continuation of U.S. application Ser. No. 18/238,542, filed on Aug. 28, 2023, which is a continuation of International Application No. PCT/KR2022/011128, filed on Jul. 28, 2022, which claims priority to and the benefit of Korean Patent Application No. 10-2021-0103273, filed on Aug. 5, 2021, the disclosure of which is incorporated herein by reference in its entirety.

BACKGROUND

Technical Field

The present disclosure relates to a mobile communication system with secondary base station change. More specifically, the present disclosure relates to a secondary node change method and an apparatus for use in the mobile communication system.

Related Art

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate the introduction of various services, 5G communication system targets supporting higher data rate and smaller latency.

SUMMARY

Aspects of the present disclosure are to address the problems of conditional secondary node change. Accordingly, an aspect of the present disclosure is to provide a method and an apparatus for supporting conditional secondary node change.

In accordance with an aspect of the present disclosure, a method of a master node in mobile communication system is provided. In the method, the master node transmits to a target node a first control message related to SGNB addition, master node receives from target node second control message related to SGNB addition, master node transmits to UE first LTE message and receives from UE second LTE message, master node and source node performs SGNB release procedure.

DETAILED DESCRIPTION

Figure 1:
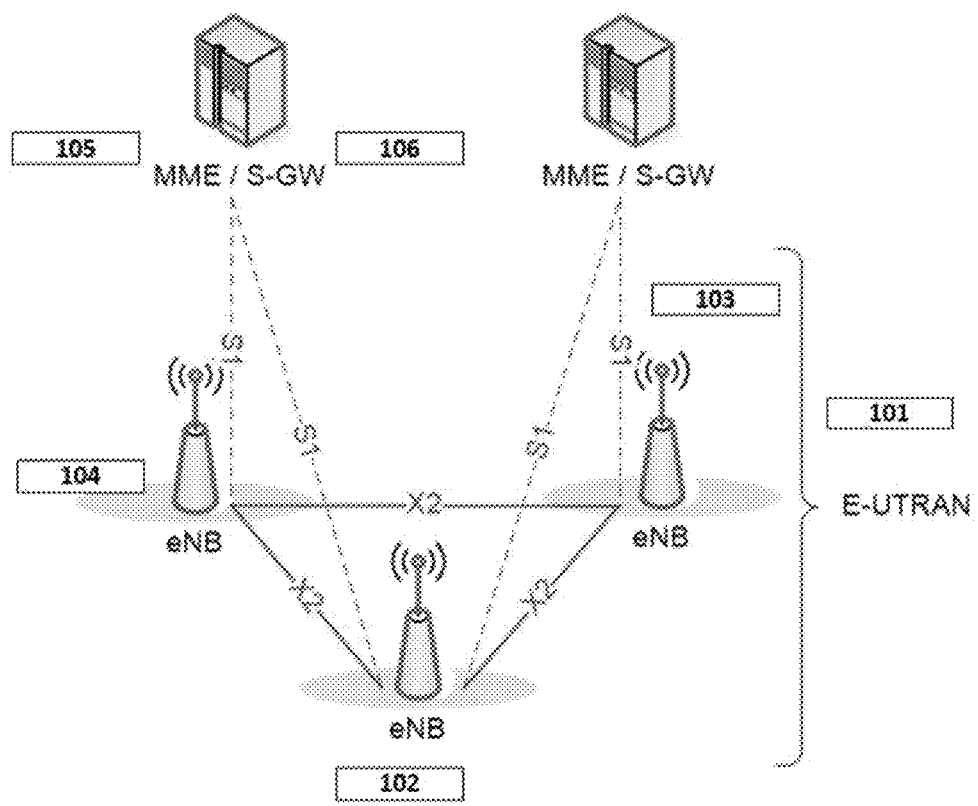
FIG. 1 is a diagram illustrating the architecture of an LTE system and an E-UTRAN to which the disclosure may be applied.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the following descriptions, UE and terminal are used as same terminology.

Table 1 lists the acronyms used throughout the present disclosure.

TABLE 1

| Acronym | Full name |
| --- | --- |
| 5GC | 5G Core Network |
| 5GS | 5G System |
| 5QI | 5G QoS Identifier |
| ACK | Acknowledgement |
| AMF | Access and Mobility Management Function |

TABLE 1-continued

| Acronym | Full name |
| --- | --- |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CAG-ID | Closed Access Group Identifier |
| CG | Cell Group |
| CHO | Conditional Handover |
| CIF | Carrier Indicator Field |
| CORESET | Control Resource Set |
| CPC | Conditional PSCell Change |
| CQI | Channel Quality Indicator |
| C-RNTI | Cell RNTI |
| CSI | Channel State Information |
| DC | Dual Connectivity |
| DCI | Downlink Control Information |
| DRB | (user) Data Radio Bearer |
| DRX | Discontinuous Reception |
| ECGI | E-UTRAN Cell Global Identifier |
| eNB | E-UTRAN NodeB |
| EN-DC | E-UTRA-NR Dual Connectivity |
| EPC | Evolved Packet Core |
| EPS | Evolved Packet System |
| E-RAB | E-UTRAN Radio Access Bearer |
| ETWS | Earthquake and Tsunami Warning System |
| E-UTRA | Evolved Universal Terrestrial Radio Access |
| E-UTRAN | Evolved Universal Terrestrial Radio Access Network |
| FDD | Frequency Division Duplex |
| FDM | Frequency Division Multiplexing |
| GBR | Guaranteed Bit Rate |
| HARQ | Hybrid Automatic Repeat Request |
| HPLMN | Home Public Land Mobile Network |
| IDC | In-Device Coexistence |
| IE | Information element |
| IMSI | International Mobile Subscriber Identity |
| KPAS | Korean Public Alert System |
| L1 | Layer 1 |
| L2 | Layer 2 |
| L3 | Layer 3 |
| LCG | Logical Channel Group |
| MAC | Medium Access Control |
| MBR | Maximum Bit Rate |
| MCG | Master Cell Group |
| MCS | Modulation and Coding Scheme |
| MeNB | Master eNB |
| MIB | Master Information Block |
| MIMO | Multiple Input Multiple Output |
| MME | Mobility Management Entity |
| MN | Master Node |
| MR-DC | Multi-Radio Dual Connectivity |
| NAS | Non-Access Stratum |
| NCGI | NR Cell Global Identifier |
| NE-DC | NR-E-UTRA Dual Connectivity |
| NGEN-DC | NG-RAN E-UTRA-NR Dual Connectivity |
| NG-RAN | NG Radio Access Network |
| NR | NR Radio Access |
| NR-DC | NR-NR Dual Connectivity |
| PBR | Prioritised Bit Rate |
| PCC | Primary Component Carrier |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PLMN | Public Land Mobile Network |
| PRACH | Physical Random Access Channel |
| PRB | Physical Resource Block |
| PSCell | Primary SCG Cell |
| PSS | Primary Synchronisation Signal |
| PUCCH | Physical Uplink Control Channel |
| PUSCH | Physical Uplink Shared Channel |
| PWS | Public Warning System |
| QFI | QoS Flow ID |
| QoE | Quality of Experience |
| QoS | Quality of Service |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCC | Secondary Component Carrier |
| SCell | Secondary Cell |
| SCG | Secondary Cell Group |
| SCS | Subcarrier Spacing |
| SDAP | Service Data Adaptation Protocol |
| SDU | Service Data Unit |
| SeNB | Secondary eNB |
| SFN | System Frame Number |
| S-GW | Serving Gateway |
| SI | System Information |
| SIB | System Information Block |
| (S-/T-) SN | (Source/Target) Secondary Node |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TDD | Time Division Duplex |
| TDM | Time Division Multiplexing |
| TRP | Transmit/Receive Point |
| UCI | Uplink Control Information |
| UE | User Equipment |
| UL-SCH | Uplink Shared Channel |
| UPF | User Plane Function |

Table 2 lists the terminologies and their definition used throughout the present disclosure.

TABLE 2

| Terminology | Definition |
| --- | --- |
| Cell | combination of downlink and optionally uplink resources. The linking between the carrier frequency of the downlink resources and the carrier frequency of the uplink resources is indicated in the system information transmitted on the downlink resources. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Information element | A structural element containing single or multiple fields is referred as information element. |
| NR | NR radio access |
| PCell | SpCell of a master cell group. |

TABLE 2-continued

| Terminology | Definition |
| --- | --- |
| Primary SCG Cell | For dual connectivity operation, the SCG cell in which the UE performs random access when performing the Reconfiguration with Sync procedure. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Cell Group | in dual connectivity, a group of serving cells associated with either the MeNB or the SeNB. |
| En-gNB | node providing NR user plane and control plane protocol terminations towards the UE, and acting as Secondary Node in EN-DC. |
| Master Cell Group | in MR-DC, a group of serving cells associated with the Master Node, comprising of the SpCell (PCell) and optionally one or more SCells. |
| Master node | in MR-DC, the radio access node that provides the control plane connection to the core network. It may be a Master eNB (in EN-DC), a Master ng-eNB (in NGEN-DC) or a Master gNB (in NR-DC and NE-DC). |
| NG-RAN node | either a gNB or an ng-eNB. |
| PSCell | SpCell of a secondary cell group. |
| Secondary Cell | For a UE configured with CA, a cell providing additional radio resources on top of Special Cell. |
| Secondary Cell Group | in MR-DC, a group of serving cells associated with the Secondary Node, comprising of the SpCell (PSCell) and optionally one or more SCells. |
| Secondary node | in MR-DC, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC). |
| Conditional PSCell Change | a PSCell change procedure that is e10cuted only when PSCell e10cution condition(s) are met. |
| gNB Central Unit (gNB-CU) | a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. |
| gNB Distributed Unit (gNB-DU) | a logical node hosting RLC, MAC and PHY layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU. |
| E-RAB | An E-RAB uniquely identifies the concatenation of an S1 Bearer and the corresponding Data Radio Bearer. When an E-RAB exists, there is a one-to-one mapping between this E-RAB and an EPS bearer of the Non Access Stratum (NAS) as defined in TS 23.401 [3]. |

Table 3 lists abbreviations of various messages, information elements and terminologies used throughout the present disclosure.

TABLE 3

| Abbreviation | Message/IE/Terminology |
| --- | --- |
| LTE RECNF | RRCConnectionReconfiguration |
| LTE RECNF CMP | RRCConnectionReconfigurationComplete |
| CAPENQ | UECapabilityEnquiry |
| CAPINF | UECapabilityInformation |
| NR RECNF | RRCReconfiguration |
| NR RECNF CMP | RRCReconfigurationComplete |
| ULIT | ULInformationTransferMRDC |
| SGNB ADD REQ | SGNB ADDITION REQUEST |
| SGNB ADD REQ ACK | SGNB ADDITION REQUEST ACKNOWLEDGE |
| SGNB REL REQ | SGNB RELEASE REQUEST |
| SGNB REL REQ ACK | SGNB RELEASE REQUEST ACKNOWLEDGE |
| SGNB RECNF CMP | SGNB RECONFIGURATION COMPLETE |
| Transaction ID | rrc-TransactionIdentifier |
| TCSPCELL | Target Candidate SpCell |
| CRID | CondReconfigurationId |

Table 4 explains technical terminologies used throughout the present disclosure.

TABLE 4

| Terminology | Definition |
| --- | --- |
| PSCell change | It means the current PSCell changes to a new PSCell. It includes intra-SN PSCell change and inter-SN |

TABLE 4-continued

| Terminology | Definition |
| --- | --- |
| | PSCell change. PSCell addition is also considered as PSCell change. |
| CG-ConfigInfo IE | The IE is transferred from MN to SN or from CU to DU. It includes following information ue-CapabilityInfo includes various information for UE capability MeasResultList2NR includes measurement results on the candidate cells for serving cell DRX configuration of MCG |
| CG-Config IE | The IE is transferred from SN to MN or from CU to DU. It includes following information NR RRCReconfiguration which includes SCG configuration informatino. MN transfer the NR RRCReconfiguration message to UE without modifying it Information related to SCG bearer. It includes the information indicating the security key for the bearer DRX configuration of SCG ARFCN indicating the center frequency of PSCell |
| measConfig | It is configuration related to measurement and set by MN and SN separately. It comprise at least one measurement object (measObject), at least one report configuration (ReportConfig) and at least one measurement identity (measId). A measObject is identified by a MeasObjectId. A reportConfig is identified by a ReportConfigId. A measId comprises a measObjectId and a reportConfigId. MeasId instructs UE to perform a specific operation when measurement result on the associated measObject fulfils condition set by ReportConfigId |

TABLE 4-continued

| Terminology | Definition |
| --- | --- |
| TCSPCELL | It indicates target candidate SPCell. In the first procedure, plurality of cells of a single target node can be configured as target candidate SpCell. TCSPCELL can be a cell selected, by MN or S-SN, among the cells for which UE report measurement result. Throughout the first procedure, one of plurality of TCSPCELL becomes PSCell |

FIG. 1 is a diagram illustrating the architecture of an LTE system and an E-UTRAN to which the disclosure may be applied.

The E-UTRAN consists of eNBs (102, 103, 104), providing the E-UTRA user plane (PDCP/RLC/MAC/PHY) and control plane (RRC) towards the UE. The eNBs (102, 103, 104) are interconnected with each other by means of the X2 interface. The eNBs are also connected to the MME (Mobility Management Entity) (105) and to the Serving Gateway (S-GW) (106) by means of the S1. The S1 interface supports a many-to-many relation between MMEs/Serving Gateways and eNBs. MME (105) and S-GW (106) may be realized either as a physical node or as separate physical nodes.

The eNB (102, 103, 104) hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an MME at UE attachment when no routing to an MME can be determined from the information provided by the UE; and Routing of User Plane data towards Serving Gateway; and Scheduling and transmission of paging messages (originated from the MME).

The MME (105) hosts the functions such as NAS signaling, NAS signaling security, AS security control, S-GW selection, Authentication, Support for PWS message transmission and positioning management.

The S-GW (106) hosts the functions such as packet routing and forwarding, transport level packet marking in the uplink and the downlink, mobility anchoring for inter-eNB handover etc.

Figure 2:
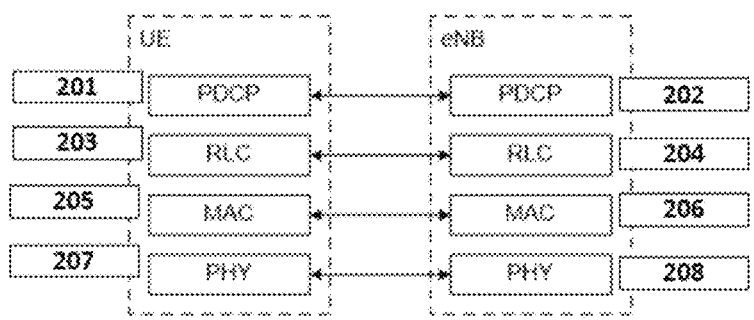
FIG. 2 is a diagram illustrating a wireless protocol architecture in an LTE system to which the disclosure may be applied.
Figure 2:
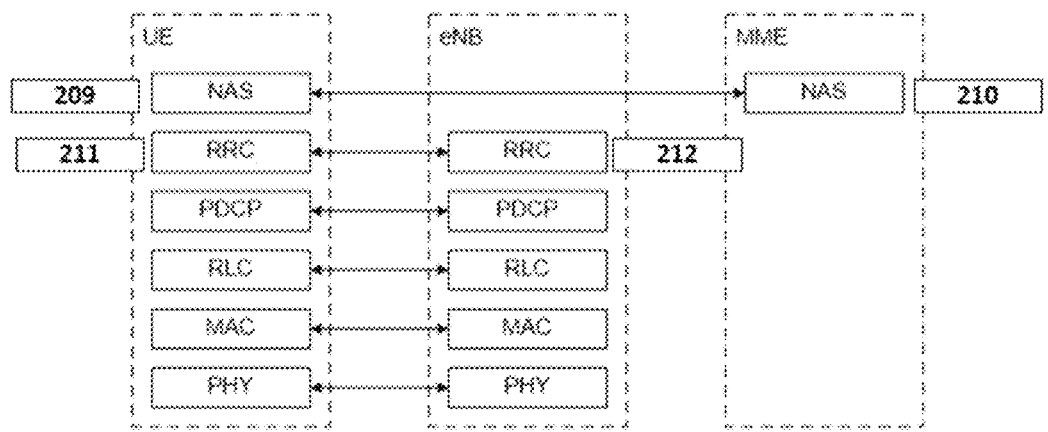

FIG. 2 is a diagram illustrating a wireless protocol architecture in an LTE system to which the disclosure may be applied.

User plane protocol stack consists of PDCP (201 or 202), RLC (203 or 204), MAC (205 or 206) and PHY (207 or 208). Control plane protocol stack consists of NAS (209 or 210), RRC (211 or 212), PDCP, RLC, MAC and PHY.

Each protocol sublayer performs functions related to the operations listed in the table 5.

TABLE 5

| Sublayer | Functions |
| --- | --- |
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Re-segmentation of RLC data PDUs, Concatenation/Segmentation/Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

Figure 3:
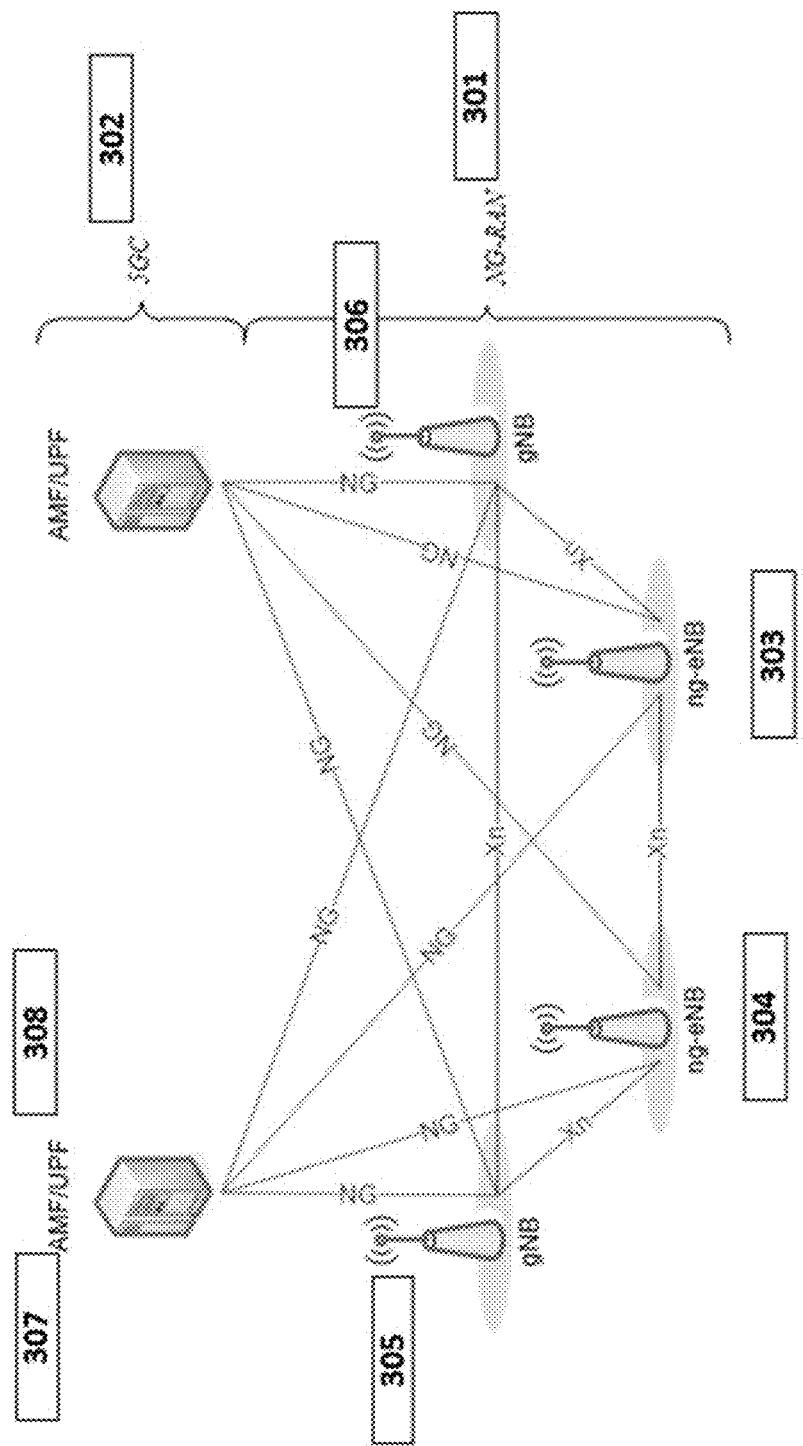
FIG. 3 is a diagram illustrating the architecture of an 5G system and a NG-RAN to which the disclosure may be applied.

FIG. 3 is a diagram illustrating the architecture of an 5G system and a NG-RAN to which the disclosure may be applied.

5G system consists of NG-RAN (301) and 5GC (302). An NG-RAN node is either:
- a gNB, providing NR user plane and control plane protocol terminations towards the UE; or
- an ng-eNB, providing E-UTRA user plane and control plane protocol terminations towards the UE.

The gNBs (305 or 306) and ng-eNBs (303 or 304) are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF (307) and UPF (308) may be realized as a physical node or as separate physical nodes.

A gNB (305 or 306) or an ng-eNBs (303 or 304) hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and
Scheduling and transmission of paging messages; and
Scheduling and transmission of broadcast information (originated from the AMF or O&M); and
Measurement and measurement reporting configuration for mobility and scheduling; and
Session Management; and
QoS Flow management and mapping to data radio bearers; and
Support of UEs in RRC_INACTIVE state; and
Radio access network sharing; and
Tight interworking between NR and E-UTRA; and
Support of Network Slicing.

The AMF (307) hosts the functions such as NAS signaling, NAS signaling security, AS security control, SMF selection, Authentication, Mobility management and positioning management.

The UPF (308) hosts the functions such as packet routing and forwarding, transport level packet marking in the uplink, QoS handling and the downlink, mobility anchoring for mobility etc.

Figure 4:
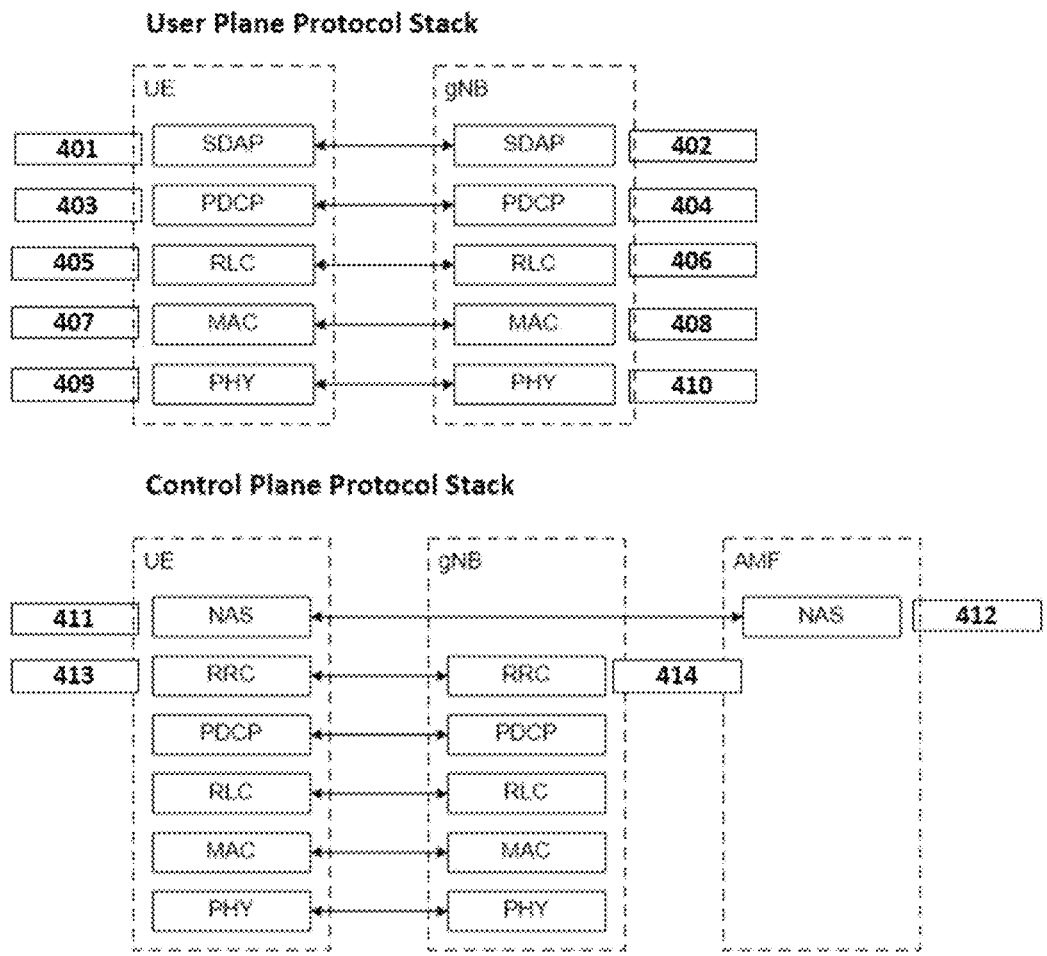
FIG. 4 is a diagram illustrating a wireless protocol architecture in an 5G system to which the disclosure may be applied.

FIG. 4 is a diagram illustrating a wireless protocol architecture in an 5G system to which the disclosure may be applied.

User plane protocol stack consists of SDAP (401 or 402), PDCP (403 or 404), RLC (405 or 406), MAC (407 or 408) and PHY (409 or 410). Control plane protocol stack consists of NAS (411 or 412), RRC (413 or 414), PDCP, RLC, MAC and PHY.

Each protocol sublayer performs functions related to the operations listed in the table 6.

LTE and NR are expected to coexist for considerable time to come. A single operator could deploy both LTE and NR within its network. For such case, providing to a UE both stable connection with LTE and high data rate with NR is possible if UE is connected to both. EN-DC enables simultaneous data transfer via LTE and NR.

In EN-DC, frequent SN change could happen due to narrow coverage of NR. SN change requires PSCell change, so they are technically synonymous. PSCell change procedure in general is consisted with that MN or S-SN get aware that PSCell change is needed, that T-SN determines the configuration of the new PSCell and that MN informs UE the configuration of the new PSCell. Depending on a given circumstances, either immediately changing the PSCell upon receiving the PSCell configuration information or changing PSCell when certain condition is met could be appropriate. In the disclosure, the latter is first reconfiguration (delayed reconfiguration or conditional reconfiguration) and the former is second reconfiguration (or immediate reconfiguration or normal reconfiguration).

The disclosure provides operations of the terminal and the base station for the first reconfiguration and for the second reconfiguration.

Figure 6:
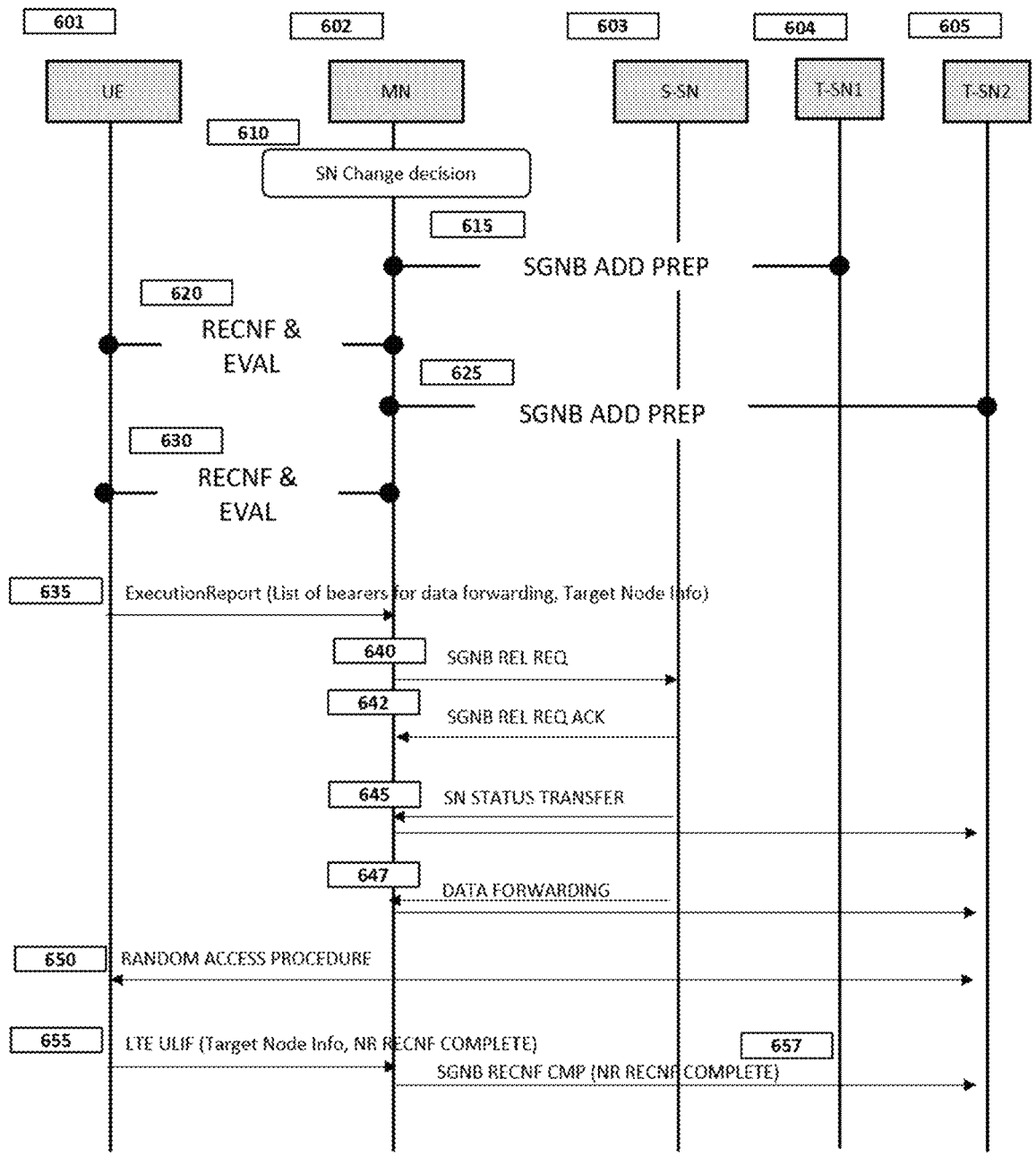
FIG. 6 is a diagram illustrating EN-DC operation performed by a UE and a base station according to the first embodiment of the present disclosure.

FIG. 6a is a diagram illustrating EN-DC operation performed by a UE and a base station according to the first embodiment of the present disclosure.

In 610, MN (602) decides SN change based on measurement result reported by UE (601). MN can select a plurality of T-SNs. FIG. 6a assumes the scenario where MN selects T-SN1(604) and T-SN2(605).

TABLE 6

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

Figure 5:
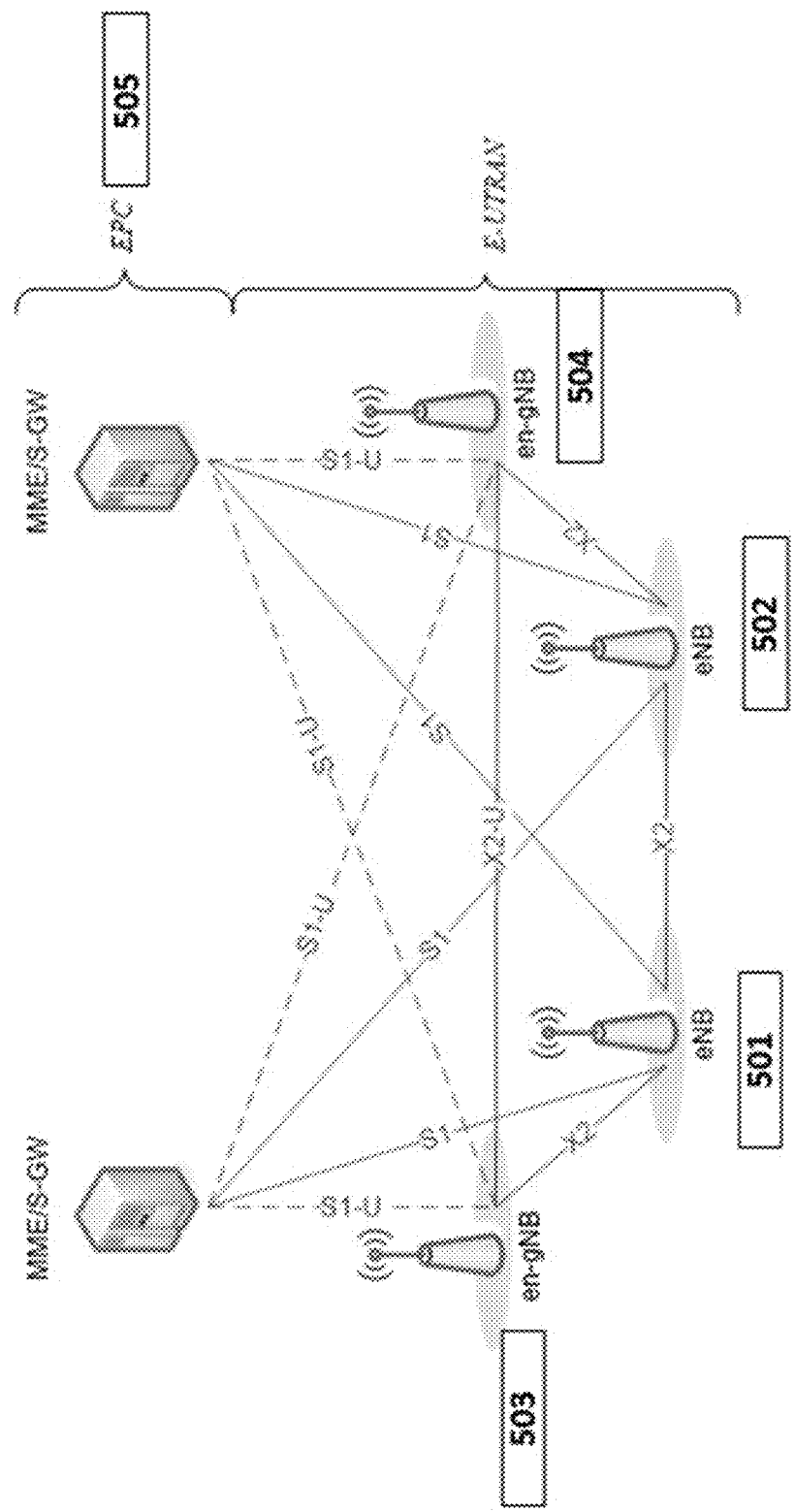
FIG. 5 is a diagram illustrating the architecture of an EN-DC to which the disclosure may be applied.

FIG. 5 is a diagram illustrating the architecture of an EN-DC to which the disclosure may be applied.

E-UTRAN supports MR-DC via E-UTRA-NR Dual Connectivity (EN-DC), in which a UE is connected to one eNB (501 or 502) that acts as a MN and one en-gNB (503 or 504) that acts as a SN. The eNB (501 or 502) is connected to the EPC (505) via the S1 interface and to the en-gNB (503 or 504) via the X2 interface. The en-gNB (503 or 504) might also be connected to the EPC (505) via the S1-U interface and other en-gNBs via the X2-U interface.

In 615, MN performs SGNB Addition Preparation procedure with T-SN1. SGNB Addition Preparation procedure comprises MN's transmitting SGNB ADD REQ to T-SN and T-SN's transmitting SGNB ADD REQ ACK. SGNB ADDREQ includes following information.

1. first information: Information indicating whether SGNB addition procedure is for first reconfiguration or for second reconfiguration.
2. second information: It is included If first reconfiguration is requested. first reconfiguration execution condition and related information determined by MN. It includes execution condition and execution condition cell group IE.
3. Measurement results on T-SN's cells
4. Data radio bearer configuration related information: Information on DRBs to be established. It can be used for T-SN's call admission control.
5. Maximum data rate related information: Expected maximum data rate of the call. It can be used for T-SN's call admission control.

The first information can be realized by various embodiments.

first reconfiguration and second reconfiguration can be distinguished by introducing new code point in SGNB Addition Trigger Indication IE. In the current specifications, SGNB Addition Trigger Indication IE is defined to indicate one of SN change, inter-eNB HO and intra-eNB HO. In this disclosure, new code point called Conditional PSCell Change is additionally defined for SGNB Addition Trigger Indication IE. If the IE indicates one of SN change, inter-eNB HO and intra-eNB HO, it is for the second reconfiguration procedure. If the IE indicates Conditional PSCell Change, it is for the first reconfiguration procedure.

Alternatively, Conditional PSCell Change (CPC) IE can be introduced to indicate the first reconfiguration procedure. CPC IE can indicate whether the corresponding procedure is to replace the current conditional reconfiguration or to initiate new conditional reconfiguration. Or a list of cells determined based on measurement results from UE, for example list of TCSPCELLs, can be used as the first information.

Upon reception of SGNB ADD REQ, T-SN (604) performs call admission control and decides whether to accept the request or not. If decide to accept, T-SN (604) sends, to MN (602), SGNB ADD REQ ACK.

The message includes information on the resource allocated to the UE, for example IE related to maximum data rate, IE related to radio bearer, logical identity to identify UE on X2 interface and Cell group configuration (CG-Config) IE. The message also includes a third information indicating whether the procedure is first reconfiguration procedure or second reconfiguration procedure. The third information can be a specific cell's cell global identity and maximum number of Conditional PSCell Change/Addition preparations for a UE toward a target GNB.

MN receives SGNB REQ ACK and proceeds to 620.

In 620, MN and UE performs RECNF procedure and condition reconfiguration evaluation on T-SN1. During RECNF procedure, MN transmits to UE LTE RECNF instructing first reconfiguration and UE transmits to MN LTE RECNF CMP.

Figure 7:
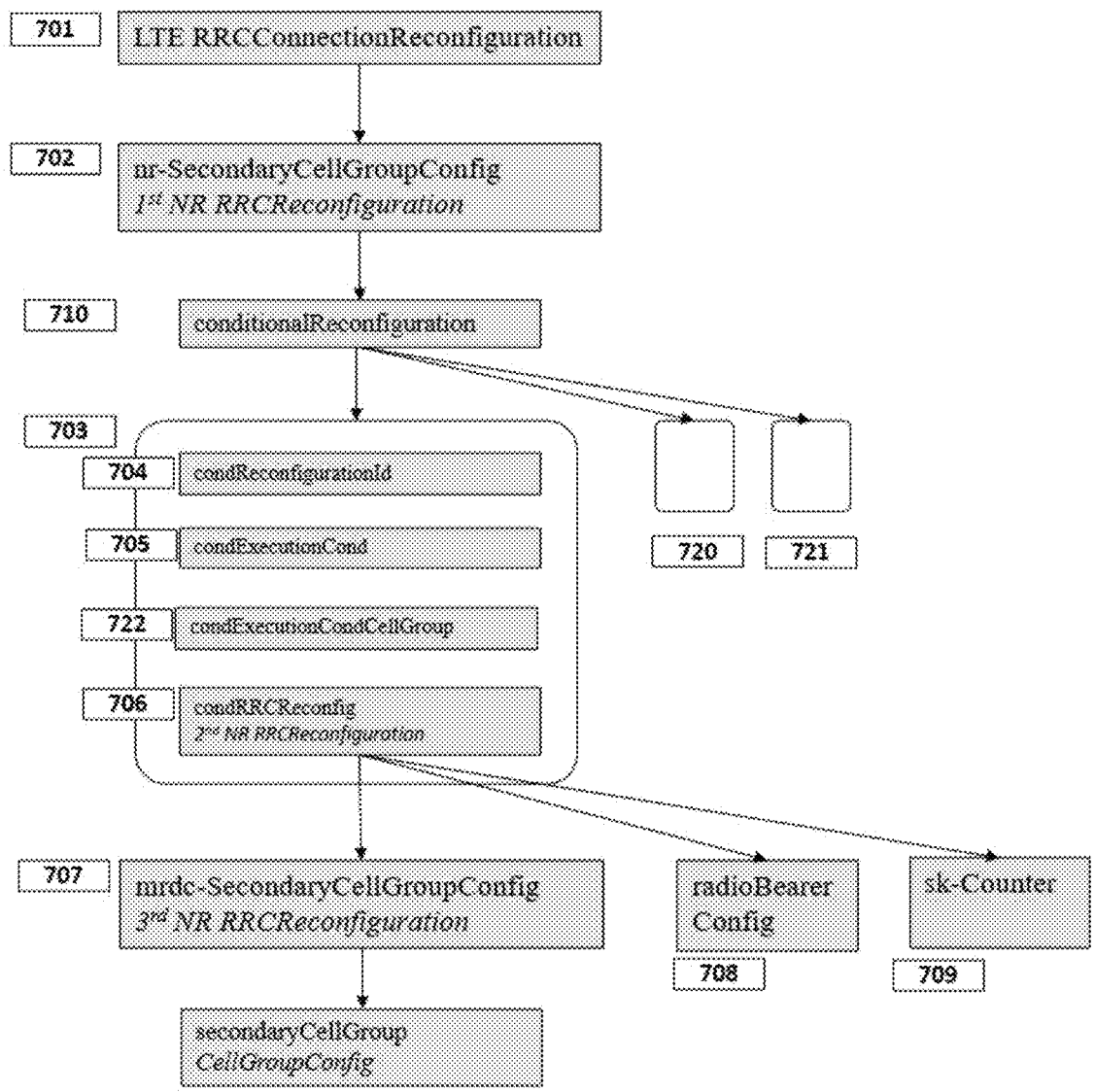
FIG. 7 is a diagram illustrating a structure of LTE reconfiguration message for the first reconfiguration procedure.

The structure of LTE RECNF to configure first reconfiguration for EN-DC UE is explained in FIG. 7.

After transmitting LTE RECNF CMP, UE performs conditional reconfiguration evaluation for TCSPCELL included in LTE RECNF CMP as followings.

UE first determines execution condition based on execution condition IE and execution condition cell group IE. The execution condition IE comprises one or two MeasId(s). The execution condition cell group IE is information indicating either master cell group (or MN) or secondary cell group (or SN). Alternatively, the information indicates only master cell group and absence of the information can be interpreted as secondary cell group being indicated. MeasId in the execution condition IE is the MeasId of the MeasConfig of the cell group indicated by execution condition cell group IE. UE considers the MeasId of the indicated cell group's MeasConfig as the execution condition. UE recognize which measurement object to measure, and which condition triggers the first reconfiguration execution based on the various parameters of MeasObject associated with the MeasId and based on the various parameters of ReportConfig associated with the MeasId.

The execution condition is determined by MN or S-SN. MN or S-SN express the determined execution condition using a MeasId defined in its MeasConfig. UE needs to know which node between MN and SN sets the execution condition to recognize what the MeasId really means. In the disclosure, above information is indicated to the UE via execution condition cell group IE.

In LTE, MeasId indicating a value between 1 and 32 and MeasId-v1250 indicating a value between 33 and 64 are defined. In the disclosure, former is 5 bit measId and latter is 5 bit measId-ext. In NR, MeasId indicating a value between 1 and 64 is defined. In the disclosure, it is 6 bit measId.

MN can inform T-SN measId for execution condition via SGNB ADD REQ. MN can transform a 5 bit measId or a 5 bit measId-ext to 6 bit measId and include it in SGNB ADD REQ. If MN selects a first 5 bit measId for execution condition, MN sets the MSB of 6 bit measId to 0 and sets remaining of 6 bit measId to the first 5 bit measId. If MN selects a second 5 bit measId for execution condition, MN sets the MSB of 6 bit measId to 1 and sets remaining of 6 bit measId to the second 5 bit measId.

UE receives 6 bit measId for the execution condition via RECNF. If the execution condition is determined by S-SN, UE determines the execution condition without transforming 6 bit measId. If the execution condition is determined by MN, UE determines the execution condition by transforming 6 bit measId either to first 5 bit measId or to second 5 bit measId.

Upon completion of above process, UE determines whether condition for conditional reconfiguration is fulfilled. UE determines whether measurement result for a cell corresponding to the cell identity indicated in third NR RECNF (i.e. TCSPCELL) fulfills execution condition. If so, UE executes conditional reconfiguration by applying second NR RECNF of the cell fulfilling the execution condition.

In 625, MN and T-SN2 perform SGNB addition preparation procedure as MN and T-SN1 did in 615.

In 630, MN and UE perform RECNF procedure and condition reconfiguration evaluation on T-SN2 as in 620.

When at least one of TCPSCELLs configured by T-SN1 and TCPSCELLs configured by T-SN2 fulfills execution condition, UE proceeds to 635. In this figure, a TCPSCELL configured by T-SN2 is assumed to fulfill the condition.

In 635, UE generates ExecutionReport control message and transmits it to MN. ExecutionReport can include following information.
1. List of SCG bearers that require data forwarding. It can be a list of E-RAB identities or a list of DRBs. Data is forwarded from S-SN to T-SN via MN. Depending on the result of call admission control of T-SN, only part of SCG bearers currently configured can be accepted by T-SN. Bearers for data forwarding are those that pass call admission control and requires data forwarding. MN request S-SN data forwarding based on the information
2. List of SCG bearers for release: List of bearers to be released based on T-SN's call admission control.

3. For each bearer requiring data forwarding, the highest PDCP COUNT value of PDCP SDUs received so far and PDCP COUNT values for reordered PDCP SDUs
4. CRID: CRID corresponding to second NR RECNF having triggered execution of first reconfiguration.

ExecutionReport control message can include target node information, which will be explained later.

In 640, MN (602) transmits SGNB REL REQ to S-SN (603) so that required steps such as SN STATUS TRANSFER procedure can be taken. SGNB REL REQ includes GTP tunnel information for data forwarding. MN can include, in the SGNB REL REQ, PDCP COUNT of the first PDCP PDU for data forwarding for each bearer requiring data forwarding.

In 642, S-SN (603) receives SGNB REL REQ, starts a specific timer and transmits SGNB REL REQ ACK to T-SN (604). S-SN (603) releases the resource allocated to the UE and discard related information upon expiry of the timer.

In 645, S-SN (603) transmits to MN (602) SN STATUS TRANSFER including uplink/downlink PDCP SN and HFN. MN forward it to T-SN (604). SN STATUS TRANSFER includes HFN and PDCP SN. MN determines T-SN for SN STATUS TRANSFER based on the target node information included in ExecutionReport.

T-SN2 (605) determines, based on SN STATUS TRANSFER, HFN and PDCP SN of downlink PDCP packet to be transmitted to UE and PDCP SN of uplink PDCP packets for which retransmission is to be requested.

In 647, S-SN (603) forwards PDCP packets to MN. MN forwards them to T-SN (604). T-SN (604) transmits those downlink PDCP packets to UE. S-SN can perform data forwarding based on PDCP COUNT of the first PDCP PDU for data forwarding. MN determines, based on target node information included in ExecutionReport, T-SN for data forwarding.

In 650, UE performs random access procedure with T-SN. During random access procedure, UE transmits preamble to a base station, the base station transmits random access response to the UE, UE performs PUSCH (Physical Uplink Shared Channel) transmission toward the base station and the base station transmits contention resolution message to UE.

In 655, UE transmits ULIT to MN. ULIT includes first NR RECNF CMP. first NR RECNF CMP includes third Transaction id. ULIT can include second target node information. If MN receives ULIT from UE, MN recognizes that the first reconfiguration is executed and performs required actions. For example, MN forwards to T-SN first NR RECNF CMP included in ULIT and initiates SGNB release procedure with S-SN. If second target node information is not included in ULIT, MN determines the target node for forwarding SGNB RECNF CMP including first NR RECNF CMP based on target node information reported in ExecutionReport. UE includes second target node information in ULIT if the target node reported in ExecutionReport is different from the actual target node. For example, T-SN1 o| channel condition of T-SN1's TCPSCELL becomes better than channel condition of T-SN2's TCPSCELL after 635, UE can reports second target node information.

In 657, MN transmits SGNB RECNF CMP to T-SN. The message includes first NR RECNF CMP. SN recognize the first NR RECNF CMP is the response to second NR RECNF from that first NR RECNF CMP includes third Transaction id. Afterward UE, MN and T-SN performs data transfer via EN-DC operation.

Target node information is a logical information identifying a target node and is an integer with a certain value range. Existing IE can be reused or new IE can be defined for target node information.

Approach to reuse an existing IE, Transaction ID, is as follows.

MN and UE can use Transaction id of LTE RECNF including NR RECNF generated by target node X.

LTE RECNF transmitted to UE in 620 includes NR RECNF generated by T-SN1 and Transaction id generated by MN. LTE RECNF transmitted to UE in 630 includes NR RECNF generated by T-SN2 and Transaction id generated by MN. If Transaction id used in 620 is x and Transaction id used in 630 is y, target node information of T-SN1 is x and target node information of T-SN2 is y.

UE can transmits to MN LTE RECNF CMP including Transaction id y in 630, ExecutionReport including Transaction id y in 630 and LTE ULIT including Transaction id y in 655. In general, a Transaction id included in a downlink control message is included in a single uplink control message. In the disclosure, a Transaction id included in a downlink control message can be included in at least two uplink control messages.

Approach to define new IE is as follows.

MN transmits, to UE, LTE RECNF including NR RECNF generated by target node x with logical identity of target node x included in the message. The logical identity can be 2 bit or 3 bit long and indicates a integer between 1 and 4 or between 1 and 8.

For example, MN allocates target node information 1 to T-SN1 in 615 and allocates target node information 2 to T-SN2 in 625. MN includes target node information 1 in the LTE RECNF including NR RECNF generated by T-SN1. MN includes target node information 2 in the LTE RECNF including NR RECNF generated by T-SN2. MN determines with which target node it should perform subsequent procedures based on target node information indicated in ExecutionReport or ULIT sent from UE. For a specific target node identity, for example 0, instead of explicitly signaling target node identity, presence/absence of target node identity can indicate whether the identity is 0 or not. If LTE RECNF including NR RECNF does not include target node identity, UE consider the NR RECNF is related to the target node of target node identity 0. If target node information is not included in ULIT or ExecutionReport, MN consider the uplink message is related to the target node with target node identity 0. In the above example, if target node information is not included for NR RECNF generated by T-SN1 and target node identity 1 is included for NR RECNF generated by T-SN2, target node identity of T-SN1 is 0 and target node identity of T-SN2 is 1.

UE associates related NR RECNF and target node identity when LTE RECNF including the target node identity is received from MN. Afterwards, upon transmitting ULIT or ExecutionReport, UE includes target node identity of target node related to the uplink message in the uplink message.

As illustrated above, by transmitting to MN before initiating random access procedure, data forwarding is triggered more quickly to shorten service interruption time.

FIG. 7 is a diagram illustrating a structure of LTE reconfiguration message for the first reconfiguration procedure LTE RECNF includes first Transaction id and ExecRepConfig and target node related information generated by MN and first NR RECNF (702) generated by T-SN. The first NR RECNF includes various information depending on the purpose of the related procedure. For the first reconfiguration, first NR RECNF includes conditionalReconfiguration (710) which includes at least one CondReconfigToAddMod IE (703 or 720 or 721).

Each CondReconfigToAddMod IE includes conditional Reconfiguration Identity (or second NR control information identity) (704), execution condition (705), execution condition cell group (722) and second NR RECNF (706). The second NR RECNF includes radio bearer configuration (708), counter for security key (709) and third NR RECNF (707). The third NR RECNF includes secondaryCellGroup IE which includes configuration information of PSCell or SpCell.

Therefore, a single first NR RECNF for first reconfiguration procedure includes plurality of target candidate PSCell/SPCell configuration information. Each of plurality of target candidate PSCell/SPCell configuration information is associated with a single execution condition IE and a single execution condition cell group IE.

The first NR RECNF includes second Transaction ID, the second NR RECNF includes third Transaction ID and the third NR RECNF includes fourth Transaction ID.

ExecRepConfig may be a 1-bit indicator that instructs the UE to report when the first procedure is executed, or it may be a list of bearers for which data transmission and reception status to be reported.

The information about the target node may be implemented in different ways as the MN may have multiple T-SNs.

Upon receiving the above message, the UE sends an LTE RECNF CMP message to the MN. The first LTE RECNF CMP consists of a first transaction id.

Figure 8:
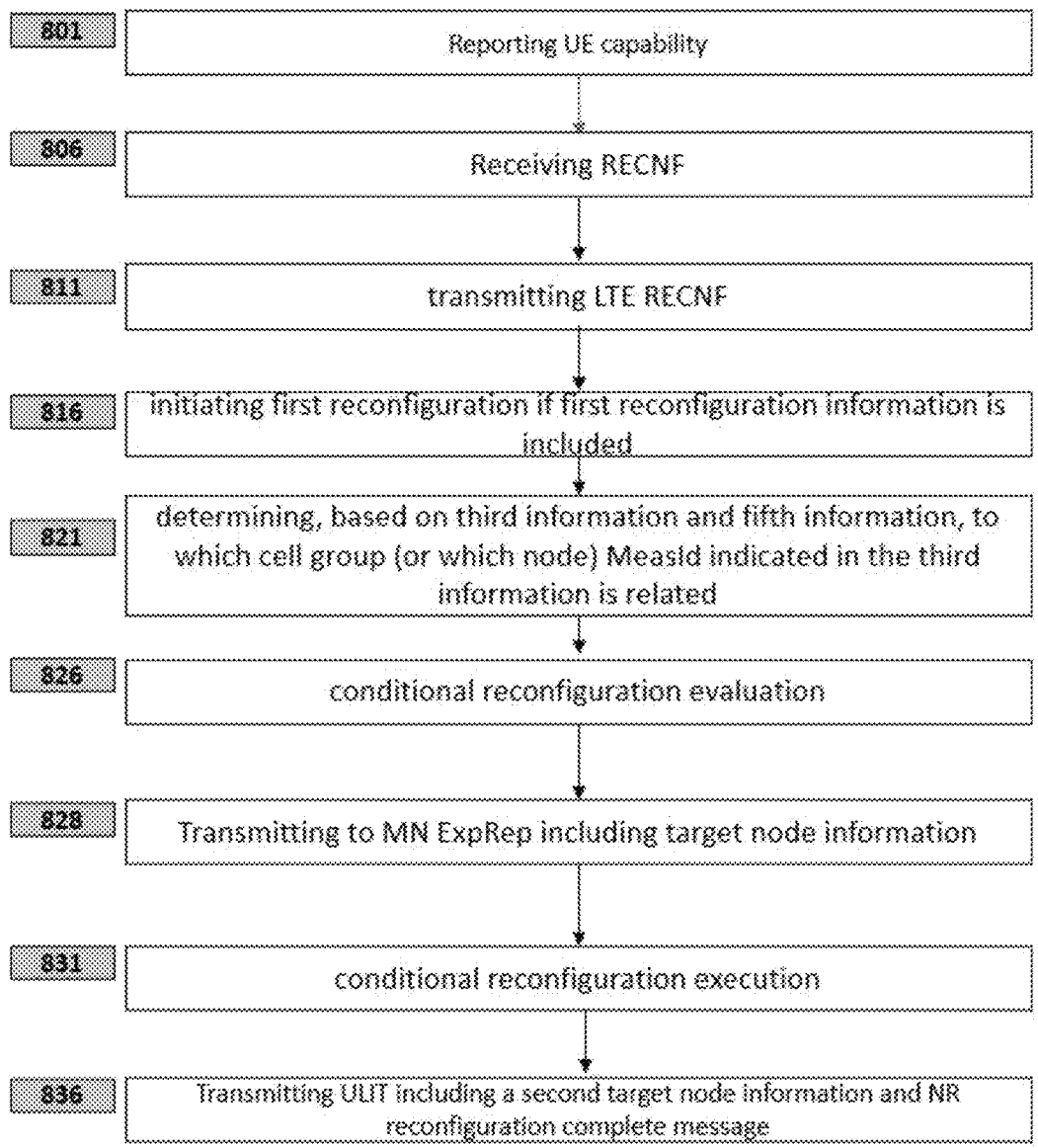
FIG. 8 is a flow diagram illustrating an operation of a terminal according to the first embodiment of the present disclosure.

FIG. 8 is a flow diagram illustrating an operation of a terminal according to the first embodiment of the present disclosure.

In 801, UE reports, to first base station (MN or MeNB), UE capability related to EN-DC and first reconfiguration procedure and ExecutionReport

- first capability information: a list of band combinations supporting EN-DN
- second capability information: a list of band combinations supporting first reconfiguration and EN-DC or list of EN-DC band combinations supporting first reconfiguration
- third capability information: a list of band combinations comprising two NR bands
- fourth capability information: 1 bit indicator indicating ExecutionReport transmission support in EN-DC or LTE
- fifth capability information: 1 bit indicator indicating ExecutionReport transmission support in NE-DC or NR
- second capability information indicates NR band of which band combination, included in the first capability information, supports first reconfiguration procedure. second capability information indicates intra-band first reconfiguration support.
- third capability information is list of band combinations with two NR bands and each band combination indicates inter-band first reconfiguration is supported between the NR bands. For example, if (N1, N2) is included in third capability information, inter-band first reconfiguration between N1 and N2 is supported. NR bands included in the band combinations of third capability information are the NR bands supporting EN-DC.

A base station to which UE reports its capability, a base station from which UE receives LTE RECNF and a base station with which UE performs random access can be different base stations. The reason is because the capability reported by UE is stored in the core network and capability reporting is performed in the initial registration and not performed afterward.

In 806, UE receives LTE RECNF. The LTE RECNF includes first NR RECNF. The first NR RECNF includes first information if the first NR RECNF is for first reconfiguration. The first information includes at least one second information. In the second information, a third information and a fourth information are mandatorily present, and a fifth information is optionally present. Information from the first information to the fifth information are those defined between UE and base station. They are different from the first information to the third information defined between MN and T-SN.

A second information corresponds to a TCSPCELL. A third information comprising one or two MeasId defines the execution condition for the TCSPCELL. A fourth information is the second NR RECNF which includes radio bearer configuration, security key information and third NR RECNF for the configuration information of TCSPCELL. fifth information indicates for which between MCG and SCG (or between MeNB and SgNB or between MN and S-SN) the execution condition is related to.

Each third information and each fifth information define the execution condition for each associated TCSPCELL (or associated second information). Alternatively, it is also possible to define a common third information and a common fifth information applicable to all candidate SpCell (or all second information) included in the first NR RECNF. It is possible to define he common third information and the common fifth information as sub-IE of first information. Then UE ignores individual third information included under second information. UE applies common third information, if present, to all TCSPCELLs included in first information. Otherwise, UE applies the third information included for each TCSPCELL.

The LTE RECNF may include sixth information which is related to execution report configuration and may include lower information such as SCG bearer list.

The LTE RECNF may include seventh information which is target node information and is an integer of certain range.

A single LTE RECNF includes a single first NR RECNF. A single first NR RECNF includes a single sixth information and plurality of second NR RECNFs. A single second NR RECNF includes a single third NR RECNF. Therefore, a single LTE RECNF includes a plurality of third NR RECNFs, a plurality of third information, a plurality of fourth information and a plurality of fifth information. The number of third NR RECNFs, the number of third information and the number of fourth information are same while the number of fifth information may be different.

A single RECNF includes a single Transaction id. The LTE RECNF includes first Transaction id. The first NR RECNF includes second Transaction id. The second NR RECNF includes third Transaction id. The third NR RECNF includes fourth Transaction id.

In 811, UE transmits LTE RECNF CMP to the first base station. The LTE RECFN CMP includes first Transaction id.

In 816, UE initiates first reconfiguration if first reconfiguration information is included in first NR RECNF in first LTE RECNF received by UE In 821, UE determines, based on third information and fifth information, to which cell group (or which node) MeasId indicated in the third information is related. If fifth information is absent, UE determines that execution condition for the corresponding TCSPCELL is set by S-SN and that the MeasId is related to source SCG (or S-SN). UE interprets MeasId according to MeasConfig of source SCG (or S-SN). If fifth information is present, UE determines that execution condition for the corresponding candidate SpCell is set by MN and that the MeasId is related to MCG (or MN). UE interprets MeasId according to MeasConfig of MCG (or MN). Alternatively, if fifth information is present, UE determines that execution condition for the corresponding TCSP-CELL is set by a CG (or by a node) between MCG and SCG (or between MN and S-SN) and UE interprets MeasId according to the MeasConfig of determined CG (or determined node).

In LTE, MeasId indicating a value between 1 and 32 and MeasId-v1250 indicating a value between 33 and 64 are defined. In the disclosure, former is 5 bit measId and latter is 5 bit measId-ext. In NR, MeasId indicating a value between 1 and 64 is defined. In the disclosure, it is 6 bit measId.

MN can inform T-SN measId for execution condition via SGNB ADD REQ. MN can transform a 5 bit measId or a 5 bit measId-ext to 6 bit measId and include it in SGNB ADD REQ. If MN selects a 5 bit measId for execution condition, MN sets the MSB of 6 bit measId to 0 and sets remaining of 6 bit measId to the 5 bit measId. If MN selects a 5 bit measId-Ext for execution condition, MN sets the MSB of 6 bit measId to 1 and sets remaining of 6 bit measId to the 5 bit measId-Ext.

UE receives 6 bit measId for execution condition in RECNF. If the execution condition is determined by S-SN, UE determines the execution condition with 6 bit measId as it is. If the execution condition is determined by MN, UE determines the execution condition with 5 bit measId or 5 bit measId-Ext transformed from 6 bit measId. If MSB of 6 bit measId is 0, UE takes the remaining 5 bit as first 5 bit measId and selects associated ReportConfig and MeasObject accordingly. If MSB of 6 bit measId is 1, UE takes the remaining 5 bit as 5 bit measId-Ext and selects associated ReportConfig and MeasObject accordingly.

In 826, UE performs conditional reconfiguration evaluation. For each second information included in first information, UE considers the serving cell indicated in third NR RECNF of second information (i.e. target candidate cell) as applicable cell. UE consider the target candidate cell as a triggered cell if event associated with the trigger condition for the cell is fulfilled. UE proceeds to 828 if at least one triggered cell occur.

In 828, if execution report is configured, UE transmits to MN ExecutionReport and proceeds to 831. If execution report is not configured, UE directly proceeds to 831. That execution report is configured means RECNF received from MN includes ExeRepConfig. UE includes, in ExecutionReport, identity of bearer requiring data forwarding, identity of bearer to be released and CRID. They are determined by control information included in third NR RECNF and CRID corresponding to second NR RECNF. UE includes target node information in ExecutionReport. The target node information is the one indicated in the LTE RECNF which has the configuration information of the triggered cell. UE includes target node information in ExecutionReport if the target node information was included in the corresponding LTE RECNF (or the corresponding second NR control information). UE does not includes target node information in ExecutionReport if the target node information was not included in the corresponding LTE RECNF (or the corresponding second NR control information).

In 831, UE executes conditional reconfiguration. UE apply the second NR RECNF for the triggered cell.

In 836, UE transmits to second base station ULIT. ULIT includes first NR RECNF CMP. first NR RECNF CMP includes third Transaction id. ULIT may include second target node information. If a target node information different from what was reported in ExecutionReport need to be reported, or if a target node information was not reported in ExecutionReport, UE includes the second target node information in ULIT. ULIT also includes CRID corresponding to triggered cell (or second NR RECFN corresponding to triggered cell)

Figure 9:
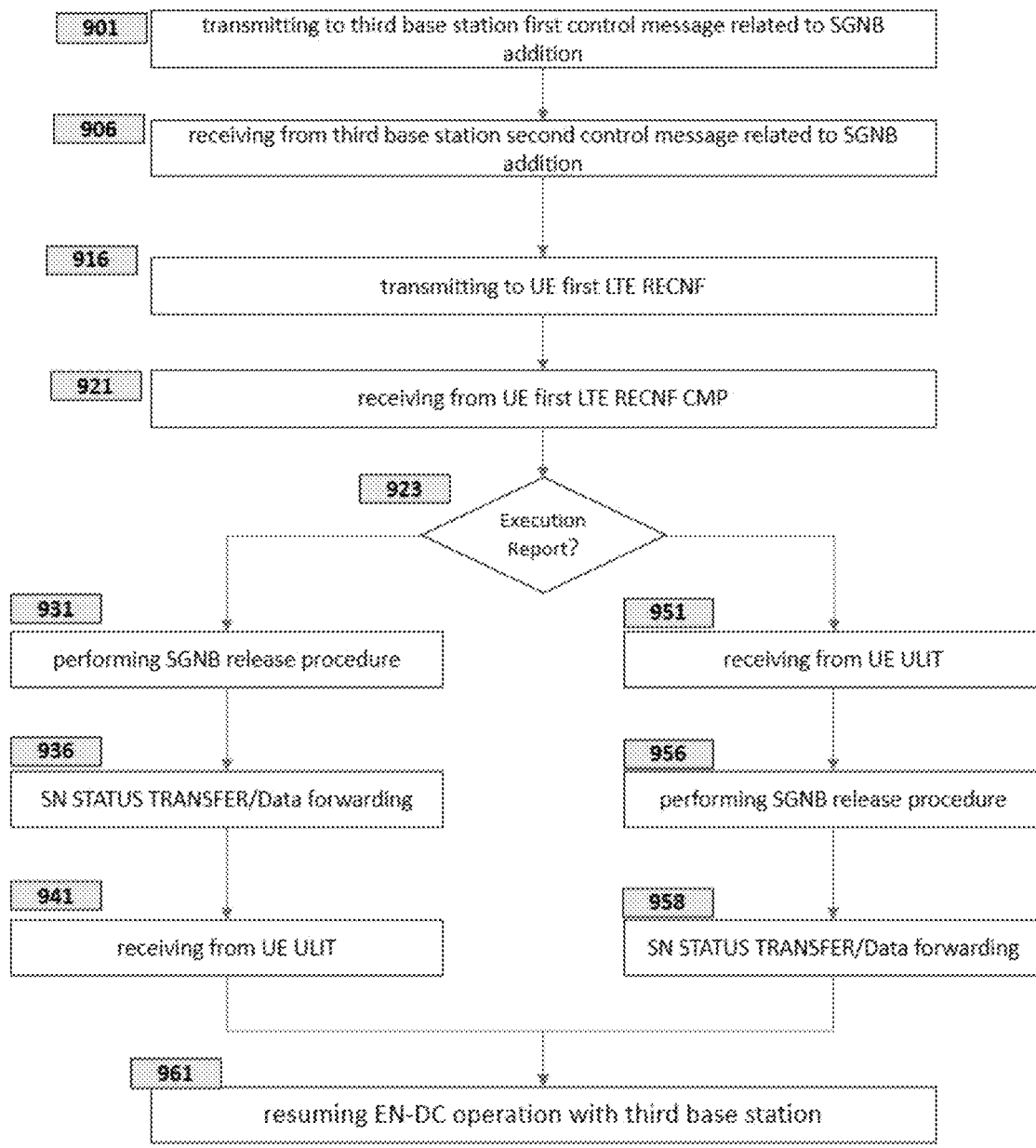
FIG. 9 is a flow diagram illustrating an operation of a master base station according to the first embodiment of the present disclosure.

FIG. 9 is a flow diagram illustrating an operation of a master node according to the first embodiment of the present disclosure.

In 901, first base station transmits to third base station (T-SN) first control message related to SGNB addition. The first control message can include first information and second information.

In 906, first base station receives from third base station second control message related to SGNB addition. The second control message can include a third information and PSCell configuration information (or target SpCell configuration information). The first base station proceeds to 816 if first condition is fulfilled. If the first base station has transmitted to third base station first control information which include first information and has received second control information, from the third base station in response to the first control message, first condition is fulfilled.

In 916, first base station transmits to UE first LTE RECNF which includes at least first Transaction id and first NR RECNF. first Transaction id is determined and inserted by first base station. first NR RECNF is generated by third base station and transmitted to first base station. first NR RECNF includes at least one second Transaction id and plurality of second NR control information. first base station can include, in first LTE RECNF, information related to execution report configuration. first base station includes target node information in LTE RECNF.

In 921, first base station receives, from UE, first LTE RECNF CMP which includes first Transaction id.

In 923, first base station checks if, from UE, ExecutionReport is received before ULIT is received. If ExecutionReport is received before ULIT, first base station proceed to 931. If ULIT is received before ExecutionReport, first base station proceeds to 951.

In 931, first base station and second base station performs SGNB release procedure. In the procedure, first base station transmits to second base station SGNB REL REQ, second base station transmits to first base station SGNB REL REQ ACK. first base station can includes, in SGNB REL REQ, some information received from ExecutionReport for example PDCP COUNT of each bearer.

In 936, first base station and second base station exchanges SN STATUS TRANSFER and performs data forwarding. Based on target node information reported in ExecutionReport, first base station identify third base station for SN STATUS TRANSFER to transmits it to the third base station and perform data forwarding with third base station.

In 941, first base station receives from UE ULIT which includes first Transaction id and first NR RECNF CMP. first NR RECNF CMP includes at least third Transaction id. MN (first base station) transmits, if second target node information is included in ULIT, SGNB RECNF CMP to the base station indicated in second target node information. If ULIT does not include second target node information, MN (first base station) transmits SGNB RECNF CMP to the base station indicated in the target node information included in ExecutionReport. SGNB RECNF CMP includes first NR RECNF CMP. 941 and 936 are independent procedures and time domain order of them can change. For example, 641 can start before 936 or during 936.

In 961, first base station, UE and third base station complete the procedure and performs EN-DC operation.

In 951, first base station receives from UE ULIT, which includes first Transaction id, first NR RECNF CMP and target node information. first NR RECNF CMP includes at least second Transaction id. MN (first base station) transmits, to a base station indicated in target node information, SGNB RECNF CMP which includes at least first NR RECNF CMP.

In 956, first base station and second base station performs SGNB release procedure. In the procedure, first base station transmits to second base station SGNB REL REQ, second base station transmits to first base station SGNB REL REQ ACK.

In 958, first base station and second base station exchanges SN STATUS TRANSFER and performs data forwarding. Based on target node information reported in ExecutionReport, first base station identify third base station for SN STATUS TRANSFER to transmits it to the third base station and perform data forwarding with third base station.

In 961, first base station, UE and third base station complete the procedure and performs EN-DC operation.

Figure 10:
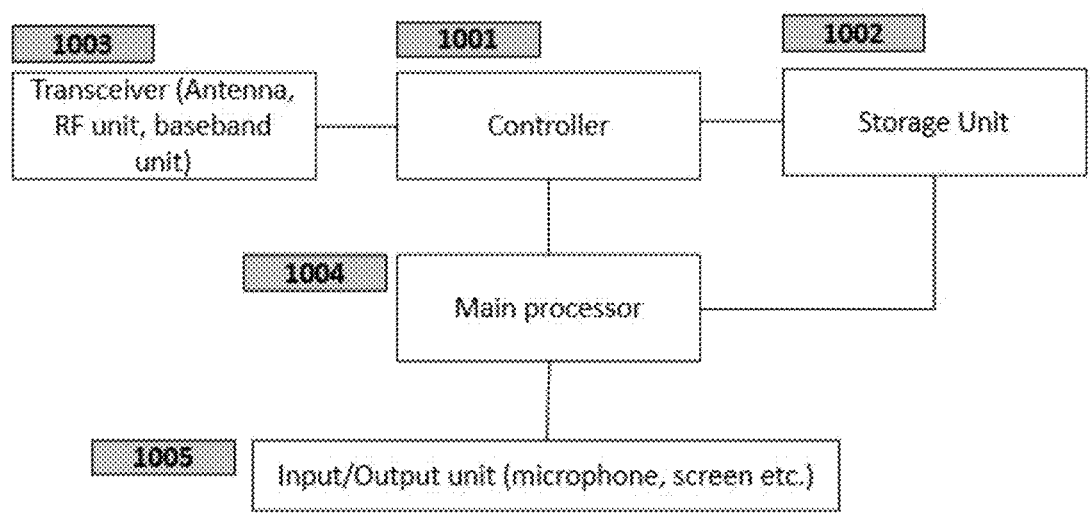
FIG. 10 is a block diagram illustrating the internal structure of a UE to which the disclosure is applied.

FIG. 10 is a block diagram illustrating the internal structure of a UE to which the disclosure is applied.

Referring to the diagram, the UE includes a controller (1001), a storage unit (1002), a transceiver (1003), a main processor (1004) and I/O unit (1005).

The controller (1001) controls the overall operations of the UE in terms of mobile communication. For example, the controller (1001) receives/transmits signals through the transceiver (1003). In addition, the controller (1001) records and reads data in the storage unit (1002). To this end, the controller (1001) includes at least one processor. For example, the controller (1001) may include a communication processor (CP) that performs control for communication and an application processor (AP) that controls the upper layer, such as an application program. The controller controls storage unit and transceiver such that UE operations illustrated in FIG. 8 are performed.

The storage unit (1002) stores data for operation of the UE, such as a basic program, an application program, and configuration information. The storage unit (1002) provides stored data at a request of the controller (1001).

The transceiver (1003) consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor (1004) controls the overall operations other than mobile operation. The main processor (1004) process user input received from I/O unit (1005), stores data in the storage unit (1002), controls the controller (1001) for required mobile communication operations and forward user data to I/O unit (1005).

I/O unit (1005) consists of equipment for inputting user data and for outputting user data such as a microphone and a screen. I/O unit (1005) performs inputting and outputting user data based on the main processor's instruction.

Figure 11:
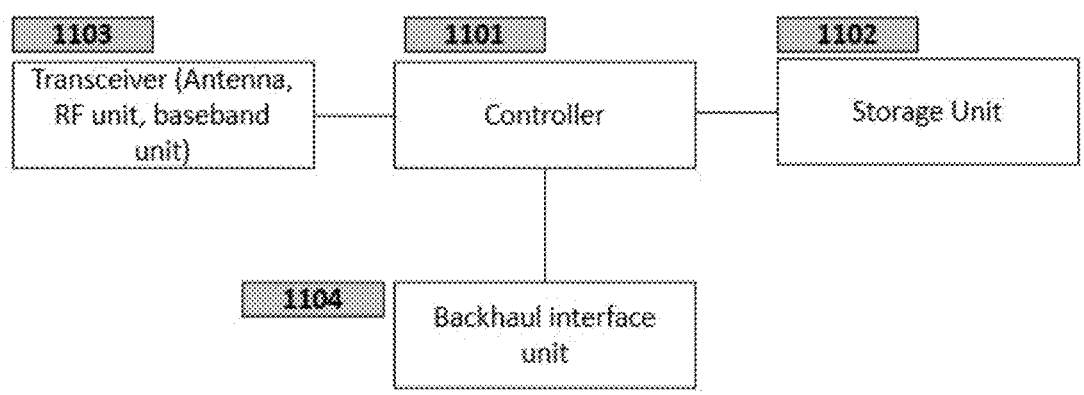
FIG. 11 is a block diagram illustrating the configuration of a base station according to the disclosure.

FIG. 11 is a block diagram illustrating the configuration of a base station according to the disclosure.

As illustrated in the diagram, the base station includes a controller (1101), a storage unit (1102), a transceiver (1103) and a backhaul interface unit (1104).

The controller (1101) controls the overall operations of the main base station. For example, the controller (1101) receives/transmits signals through the transceiver (1103), or through the backhaul interface unit (1104). In addition, the controller (1101) records and reads data in the storage unit (1102). To this end, the controller (1101) may include at least one processor. The controller controls transceiver, storage unit and backhaul interface such that base station operation illustrated in FIG. 9 are performed.

The storage unit (1102) stores data for operation of the main base station, such as a basic program, an application program, and configuration information. Particularly, the storage unit (1102) may store information regarding a bearer allocated to an accessed UE, a measurement result reported from the accessed UE, and the like. In addition, the storage unit (1102) may store information serving as a criterion to determine whether to provide the UE with multi-connection or to discontinue the same. In addition, the storage unit (1102) provides stored data at a request of the controller (1101).

The transceiver (1103) consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit (1104) provides an interface for communicating with other nodes inside the network. The backhaul interface unit (1104) converts a bit string transmitted from the base station to another node, for example, another base station or a core network, into a physical signal, and converts a physical signal received from the other node into a bit string.

What is claimed is:

1. A method by a master node (MN), the method comprising:
   transmitting to a first Secondary Node (SN) a first base station control message, wherein the first base station control message includes a first information indicating that a first reconfiguration procedure is requested;
   receiving from the first SN a second base station control message, wherein the second base station control message includes a second information in response that the first information was included in the first base station control message, wherein the second information includes a cell global identifier of a specific cell for the first reconfiguration procedure;
   transmitting to a terminal a first Long Term Evolution (LTE) downlink (DL) message, wherein the first LTE DL message includes a first identifier and a one or more CondReconfigToAddMod, wherein each of the one or more CondReconfigToAddMod includes execution condition and a second identifier and a New Radio (NR) DL message;
   receiving from the terminal a first LTE uplink (UL) message, wherein the first LTE UL message includes the first identifier, wherein the first identifier corresponds to the first LTE DL message;
   receiving from the terminal a second LTE UL message, wherein the second LTE UL message includes a second identifier, the second identifier corresponds to the NR DL message;
   transmitting to a second SN a third base station control message, wherein the third base station control message includes tunnel information for data forwarding; and
   transmitting to the first SN a fourth base station control message, wherein the fourth base station message includes a NR UL message received from the terminal.

2. The method of claim 1,
   wherein the third base station control message is SGNB RELEASE REQUEST message.

3. The method of claim 1,
   wherein the first reconfiguration is conditional PSCell addition.

4. The method of claim 1,
   wherein the first base station control message further includes measurement results for the second base station.

5. The method of claim 1,
   wherein the first information includes assistance information for the second base station to determine resource for the terminal.

6. The method of claim 1,
   wherein the second information is determined based on the first information.

7. The method of claim 1,
   wherein the second information includes information related to a plurality of PSCells.

8. The method of claim 1,
   wherein the second base station control message includes Cell Group configuration.

9. The method of claim 8,
   wherein the Cell Group configuration includes the DL NR message.

10. The method of claim 8,
    wherein the Cell Group configuration further includes:
    information related to Secondary Cell Group bearer; and
    Discontinuous Reception configuration of Secondary Cell Group.

11. The method of claim 1,
    wherein the first LTE DL message includes a parameter for execution condition.

12. The method of claim 1,
    wherein the first LTE DL message further includes a parameter indicate the execution condition is related to measurement configuration of Secondary Cell Group.

13. The method of claim 11,
    wherein the parameter for execution condition is determined by the second SN.

14. The method of claim 1,
    wherein the NR UL message in the fourth base station control message is received in the second LTE UL message.

15. The method of claim 1,
    wherein data forwarding from the second SN to the first SN is performed based on third information in the second LTE UL message.

16. The method of claim 15,
    wherein the third information is the second identifier.

17. The method of claim 2,
    wherein the SGSN RELEASE REQUEST message is transmitted to the second SN in response that LTE UL message that includes the second identifier is received.

18. The method of claim 1 further comprising:
    transmitting by the MN to the second SN a fifth base station control message, wherein the fifth base station control message includes Packet Data Convergence Protocol (PDCP) Sequence Number.

19. The method of claim 18,
    wherein the transmitting the fifth base station control message is performed after the transmitting the third message.

20. A master node (MN) in a wireless communication system, the MN include:
    a transceiver configured to transmit and receive a signal; and
    a controller configured to control the transceiver to:
    transmit to a first Secondary Node (SN) a first base station control message, wherein the first base station control message includes a first information indicating that a first reconfiguration procedure is requested,
    receive from the first SN a second base station control message, wherein the second base station control message includes a second information in response that the first information was included in the first base station control message, wherein the second information includes a cell global identifier of a specific cell for the first reconfiguration procedure,
    transmit to a terminal a first Long Term Evolution (LTE) downlink (DL) message, wherein the first LTE DL message includes a first identifier and a one or more CondReconfigToAddMod, wherein each of the one or more CondReconfigToAddMod includes execution condition and a second identifier and a New Radio (NR) DL message,
    receive from the terminal a first LTE uplink (UL) message, wherein the first LTE UL message includes the first identifier, wherein the first identifier corresponds to the first LTE DL message, receive from the terminal a second LTE UL message, wherein the second LTE UL message includes a second identifier, the second identifier corresponds to the NR DL message, transmit to a second SN a third base station control message, wherein the third base station control message includes tunnel information for data forwarding, and transmit to the first SN a fourth base station control message, wherein the fourth base station message includes a NR UL message received from the terminal.

\* \* \* \* \*